US012621187B2

(12) United States Patent
Yang et al.

(10) Patent No.: US 12,621,187 B2
(45) Date of Patent: May 5, 2026

(54) INFORMATION PROCESSING METHOD, GATEWAY DEVICE, TERMINAL DEVICE, STORAGE MEDIUM, AND COMPUTER PROGRAM PRODUCT

(71) Applicant: TENCENT TECHNOLOGY (SHENZHEN) COMPANY LIMITED, Shenzhen (CN)

(72) Inventors: Feng Yang, Shenzhen (CN); Shinan Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 409 days.

(21) Appl. No.: 18/488,208

(22) Filed: Oct. 17, 2023

(65) Prior Publication Data

US 2024/0048409 A1     Feb. 8, 2024

Related U.S. Application Data

(63) Continuation of application No. PCT/CN2022/135516, filed on Nov. 30, 2022.

(30) Foreign Application Priority Data

Mar. 30, 2022     (CN) .......................... 202210325020.0

(51) Int. Cl.
*H04L 12/66*     (2006.01)
*H04L 45/745*     (2022.01)

(52) U.S. Cl.
CPC ............ *H04L 12/66* (2013.01); *H04L 45/745* (2013.01)

(58) Field of Classification Search
CPC ......... H04L 12/66; H04L 45/745; H04W 4/70
See application file for complete search history.

(56) References Cited

U.S. PATENT DOCUMENTS 8,159,972 B2 *   4/2012   Kitani ..................... H04L 49/65
                                                      370/254
2008/0095049 A1 *   4/2008   Bugenhagen ......... H04L 67/141
                                                      370/395.2

(Continued)

FOREIGN PATENT DOCUMENTS

CN         105392174 A   *   3/2016   ............. H04W 40/22
CN         107295570 A   *   10/2017   ......... H04L 12/4633

(Continued)

OTHER PUBLICATIONS

International Search Report for PCT/CN2022/135516, dated Feb. 25, 2023.

(Continued)

*Primary Examiner* — Shean Tokuta
(74) *Attorney, Agent, or Firm* — Sughrue Mion, PLLC

(57)          ABSTRACT

An information processing method, applied to an information processing system, where the information processing system includes a terminal device, an information management device, communication service systems, and a gateway device connected to the information management device and to each of the communication service systems, each communication service system corresponding to a respective communication service network, includes detecting, by the gateway device, a network connection status of the terminal device through each of the communication service systems, receiving, by the gateway device, detection response information from the terminal device through a target communication service network of the communication service networks, and determining, by the gateway device, target routing information that indicates that the gateway device and the terminal device are connected through the target communication service network.

20 Claims, 8 Drawing Sheets

(56)        References Cited

U.S. PATENT DOCUMENTS

| | | | | |
|---|---|---|---|---|
| 2011/0026468 | A1* | 2/2011 | Conrad | H04M 15/8044 |
| | | | | 455/445 |
| 2016/0192312 | A1* | 6/2016 | Lambert | H04W 48/18 |
| | | | | 455/435.2 |
| 2019/0141544 | A1* | 5/2019 | Karimli | H04W 28/0268 |
| 2020/0092121 | A1* | 3/2020 | Skillermark | H04L 12/4633 |
| 2020/0374979 | A1* | 11/2020 | Rice | H04B 1/3816 |
| 2021/0127317 | A1* | 4/2021 | Lu | H04W 40/22 |
| 2022/0141258 | A1* | 5/2022 | Rice | H04L 65/65 |
| | | | | 370/352 |

FOREIGN PATENT DOCUMENTS

| | | | | | |
|---|---|---|---|---|---|
| CN | 108737206 | A | | 11/2018 | |
| CN | 109474528 | A | | 3/2019 | |
| CN | 109756450 | A | | 5/2019 | |
| CN | 111083120 | A | | 4/2020 | |
| CN | 111225375 | A | | 6/2020 | |
| CN | 113596938 | A | * | 11/2021 | H04W 48/10 |
| CN | 113630333 | A | | 11/2021 | |
| CN | 113708995 | A | | 11/2021 | |
| CN | 113783741 | A | | 12/2021 | |
| CN | 113824721 | A | * | 12/2021 | H04L 63/0876 |
| KR | 20220064700 | A | * | 5/2022 | H04L 67/147 |
| WO | WO-2012042378 | A2 | * | 4/2012 | H04W 68/025 |
| WO | WO-2018189253 | A1 | * | 10/2018 | H04W 36/1446 |
| WO | WO-2020200118 | A1 | * | 10/2020 | H04W 76/27 |
| WO | WO-2021038863 | A1 | * | 3/2021 | H04W 36/324 |
| WO | 2021/060598 | A1 | | 4/2021 | |
| WO | WO-2022094584 | A1 | * | 5/2022 | G01C 21/3453 |
| WO | WO-2022094586 | A1 | * | 5/2022 | H04L 45/28 |

OTHER PUBLICATIONS

Written Opinion for PCT/CN2022/135516, dated Feb. 25, 2023.
Chinese Office Action dated Apr. 28, 2024 in Application No. 202210325020.0.
Extended European Search Report dated Oct. 22, 2024 in application No. 22934871.9.

* cited by examiner

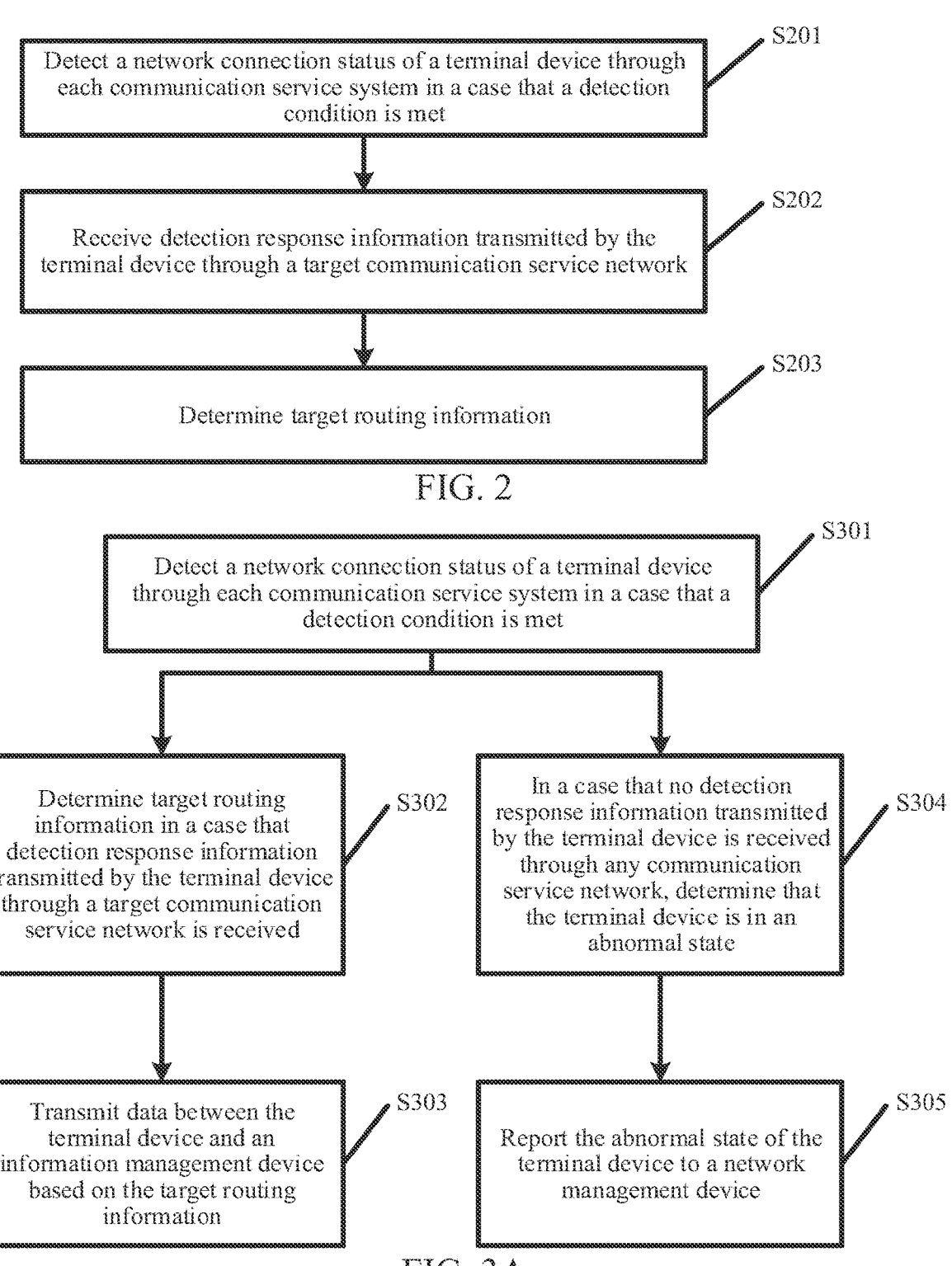

S201

Detect a network connection status of a terminal device through each communication service system in a case that a detection condition is met

S202

Receive detection response information transmitted by the terminal device through a target communication service network

S203

Determine target routing information

Detect a network connection status of a terminal device through each communication service system in a case that a detection condition is met

S302

Determine target routing information in a case that detection response information transmitted by the terminal device through a target communication service network is received

S304

In a case that no detection response information transmitted by the terminal device is received through any communication service network, determine that the terminal device is in an abnormal state

S303

Transmit data between the terminal device and an information management device based on the target routing information

S305

Report the abnormal state of the terminal device to a network management device

FIG. 3A

Switch a connected communication service network from an initial communication service network to a target communication service network in a case that a network switching condition is met — S401

Transmit detection response information to a gateway device through the target communication service network — S402

8000

Gateway device

8001

Processor

8002

Communication
interface

8004

8003

Memory

8100

Terminal device

8101

Processor

8102

Communication
interface

8104

8103

Memory

INFORMATION PROCESSING METHOD, GATEWAY DEVICE, TERMINAL DEVICE, STORAGE MEDIUM, AND COMPUTER PROGRAM PRODUCT

CROSS-REFERENCE TO RELATED APPLICATIONS

This application is a continuation application of International Patent Application No. PCT/CN2022/135516 filed on Nov. 30, 2022, which claims priority to Chinese Patent Application No. 202210325020.0 filed on Mar. 30, 2022, the entireties of which are incorporated by reference.

FIELD

The disclosure relates to the field of communication technologies, and in particular, to an information processing method, a gateway device, a terminal device, a storage medium, and a computer program product.

BACKGROUND

As an extension and expansion product based on the Internet, the Internet of Things can enable various devices, such as a wearable device, an environmental monitoring device, and a virtual reality device, to exchange data by accessing a cellular mobile network or the like, to implement more extensive connections between things and between things and persons. A massive amount of data can be communicated by such wearable devices.

SUMMARY

According to an aspect of one or more embodiments, there is provided information processing method, applied to an information processing system, wherein the information processing system comprises a terminal device, an information management device, a plurality of communication service systems, and a gateway device connected to the information management device and to each of the plurality of communication service systems, each of the plurality of communication service systems corresponding to a respective communication service network. The information processing method comprises detecting, by the gateway device, a network connection status of the terminal device through each of the plurality of communication service systems; receiving, by the gateway device, detection response information from the terminal device through a target communication service network of the plurality of communication service networks; and determining, by the gateway device, target routing information that indicates that the gateway device and the terminal device are connected through the target communication service network.

According to other aspects of one or more embodiments, there is also provided a gateway device and a non-transitory computer readable medium consistent with the information processing method.

BRIEF DESCRIPTION OF THE DRAWINGS

FIG. 2 is a first schematic flowchart of an information processing method according to some embodiments.

FIG. 3A is a second schematic flowchart of an information processing method according to some embodiments.

DETAILED DESCRIPTION

Figures 1A, 1B:
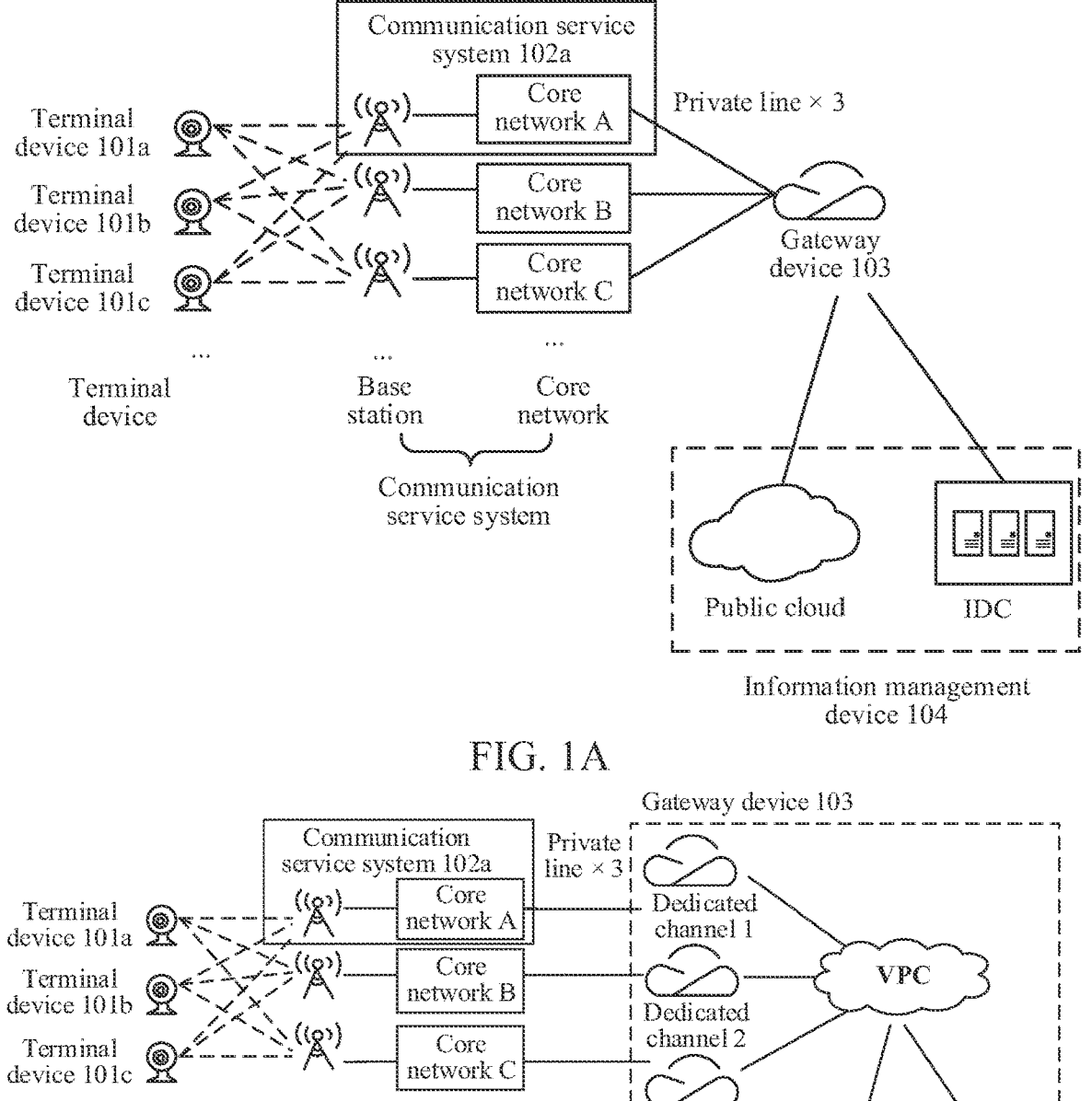
FIG. 1A is an architectural diagram of an information processing system according to some embodiments.
FIG. 1B is an architectural diagram of another information processing system according to some embodiments.

Certain embodiments are described in detail below with reference to the drawings. The described embodiments are not to be construed as a limitation to the present disclosure.

In the following descriptions, some related embodiments describe a subset of all possible embodiments. However, it may be understood that the some embodiments may be the same subset or different subsets of all the possible embodiments, and may be combined with each other without conflict.

"Plurality of", as mentioned in the specification means two or more. "And/or" describes an association relationship for describing associated objects and represents that three relationships may exist. For example, A/B may represent the following cases: Only A exists, both A and B exist, and only B exists. Similarly, the phrase "at least one of A and B" includes within its scope "only A", "only B" and "A and B". The character "I" in this specification generally indicates an "or" relationship between the associated objects unless otherwise noted or the context suggests otherwise.

Some embodiments provide an information processing method, a gateway device, a terminal device, a computer-readable storage medium, and a computer program product, to ensure accuracy of a communication link between devices, and ensure service availability.

Some embodiments provide an information processing method. The method may be applied to an information processing system. The information processing system includes a terminal device, a plurality of communication service systems, a gateway device, and an information management device. Each communication service system may correspond to a communication service network. The gateway device may be connected to each communication service system and may be connected to the information management device. The method includes:

detecting a network connection status of the terminal device through each communication service system based on a detection condition being met;

receiving detection response information transmitted by the terminal device through a target communication service network, wherein the target communication service network may be a communication service network of the plurality of communication service networks that is accessed by the terminal device; and determining target routing information, the target routing information indicating that the gateway device and the terminal device are connected through the target communication service network.

Some embodiments provide another information processing method. The method may be applied to an information processing system. The information processing system may include a terminal device, a plurality of communication service systems, a gateway device, and an information management device. Each communication service system may correspond to a communication service network. The gateway device may be connected to each communication service system and may be connected to the information management device. The method includes:

switching a connected communication service network from an initial communication service network to a target communication service network in a case that a network switching condition is met, the initial communication service network and the target communication service network being different communication service networks of a plurality of communication service networks; and transmitting detection response information to the gateway device through the target communication service network, the detection response information being used for indicating the gateway device to determine target routing information based on a transmission path of the detection response information, the detection response information being generated and transmitted by the gateway device in a process of detecting a network connection status of the terminal device through each communication service network.

Some embodiments provide a gateway device, included in an information processing system. The information processing system further includes a terminal device, a plurality of communication service systems, and an information management device. Each communication service system corresponds to at least one of a plurality of communication service networks. The gateway device may be connected to each communication service system and may be connected to the information management device. The gateway device includes:

a detection module, configured to detect a network connection status of the terminal device through each communication service system in a case that a detection condition is met;

a transceiver module, configured to receive detection response information transmitted by the terminal device through a target communication service network, the target communication service network being a communication service network of the plurality of communication service networks that is accessed by the terminal device; and a determining module, configured to determine target routing information, the target routing information being used for indicating that the gateway device and the terminal device are connected through the target communication service network.

Some embodiments further provide a terminal device, included in an information processing system. The information processing system further includes a gateway device, a plurality of communication service systems, and an information management device. Each communication service system corresponds to a communication service network. The gateway device may be connected to each communication service system and may be connected to the information management device. The terminal device includes:

a switching module, configured to switch a connected communication service network from an initial communication service network to a target communication service network in a case that a network switching condition is met, the initial communication service network and the target communication service network being different communication service networks of a plurality of communication service networks; and a transceiver module, configured to transmit detection response information to the gateway device through the target communication service network, the detection response information being used for indicating the gateway device to determine target routing information based on a transmission path of the detection response information, and the detection response information being generated and transmitted by the gateway device in a process of detecting a network connection status of the terminal device through each communication service network.

Some embodiments further provide a gateway device, including a processor and a memory. The processor may be connected to the memory and the network interface.

The network interface is configured to provide a network communication function. The memory may be configured to store program code. The processor may be configured to invoke the program code to perform the information processing method.

Some embodiments further provide a terminal device, including a processor and a memory. The processor may be connected to the memory and the network interface. The network interface is configured to provide a network communication function. The memory may be configured to store program code. The processor may be configured to invoke the program code to perform the information processing method.

Some embodiments provide a computer-readable storage medium. The computer-readable storage medium stores a computer program, and the information processing method may be performed when the computer program is executed by a processor.

Some embodiments provide a computer program product or a computer program. The computer program product includes a computer program, and the operations of the information processing method are implemented when the computer program is executed by a processor.

The following describes related terms and concepts that may be included in some embodiments.

Virtual Private Cloud (VPC): A dedicated network or a private network. The VPC is a collection of resources managed by a public cloud, running on the public cloud, and obtained by isolating some public cloud resources for an object for private use by the object. This can ensure that resources are isolated between objects, and an object is not affected by another object when using a resource.

Multi-card single-standby: A standard Internet of Things card integrates a plurality of SIMs of service provider objects, and controls switching between the SIMs of the service provider objects through an electrical signal.

Service provider object: an object or an organization that provides a network service for a terminal device.

Internet of Things card: a traffic pool specified by a service provider object according to a customer requirement. The Internet of Things card may be inserted or embedded in an Internet of Things terminal device, so that the Internet of Things terminal device can access cloud resources in a directed manner through a private Internet of Things network built by the service provider object.

Virtual intranet: An intranet, namely, a local area network (LAN), is a computer group formed by interconnecting a plurality of computers in a specific area. An intranet router requires only one external IP address to connect N computer devices to a network. Different intranet IP addresses may be reused.

APN: access point name.

DNN: data network name, which is an APN in a 5G system.

IDC: Internet data center.

Based on the foregoing terms and concepts, the following describes an architecture of an information processing system according to various embodiments with reference to the accompanying drawings.

FIG. 1A is an architectural diagram of an information processing system according to some embodiments. As shown in FIG. 1A, the information processing system includes terminal devices (including a terminal device 101a, a terminal device 101b, a terminal device 101c, . . . ), a plurality of communication service systems (including a communication service system 102a, a communication service system 102b (not shown in FIG. 1A), a communication service system 102c (not shown in FIG. 1A), . . . ), a gateway device 103, and an information management device 104. Each communication service system corresponds to a communication service network (namely, a core network shown in the figure), and a plurality of communication service networks correspond to different service provider objects. The gateway device 103 may be connected to each communication service system and may be connected to the information management device 104. In actual application, the gateway device 103 may establish a communication connection to the communication service system in a wired (for example, through a private line) or wireless manner. Similarly, the gateway device 103 may establish a communication connection to the information management device 104 in a wired or wireless manner.

In the foregoing information processing system, any terminal device has a capability of accessing communication service networks provided by a plurality of service provider objects, and a connection between the terminal device and the communication service system may also be established in a wired or wireless manner. When the information processing system is applied to an Internet of Things scenario, a network including the plurality of communication service systems and the gateway devices 103 may be defined as a virtual private Internet of Things network herein. The virtual private Internet of Things network may establish a two-way connection to the information management device 104, for example, a server in a public cloud or an IDC, to pull or upload various types of structured or streaming data, for example, a databases or a video stream.

The terminal device may be an Internet of Things terminal device, including but not limited to a smartphone, a tablet computer, a smart wearable device, a smart voice interaction device, a smart home appliance, a personal computer, a vehicle-mounted terminal, a smart camera, customer premise equipment (CPE) such as 4G/5G CPE, and other devices. However, embodiments are not limited thereto. Moreover, a quantity of terminal devices is not particularly limited. The terminal device may access at least one of the plurality of communication service networks. In an embodiment, the terminal device accesses any one of the plurality of communication service networks through a composite subscriber identity module. The composite subscriber identity module integrates identity information corresponding to each of the plurality of service provider objects. For example, the terminal device may be an Internet of Things terminal device. The Internet of Things terminal device may control switching between subscriber identity modules of service provider objects, that is, switching performed for accessing a corresponding communication service network, through an electrical signal based on a standard Internet of Things card that integrates subscriber identity modules (SIMs) of a plurality of service provider objects. In some embodiments, an operating mode of the Internet of Things terminal device includes a multi-card single-standby mode. To be specific, a plurality of subscriber identity modules may access any communication service network, and transmit data through the accessed communication service network.

In another embodiment, the terminal device accesses at least one of the plurality of communication service networks through a plurality of subscriber identity modules, and the subscriber identity modules respectively belong to different service provider objects (for example, operators). To be specific, a plurality of subscriber identity modules, rather than an integrated standard subscriber identity module that supports a multi-card single-standby mode, can be inserted or embedded in the terminal device. In some embodiments, an operating mode of the terminal device includes either a multi-card single-standby mode or a multi-card multi-standby mode. The multi-card multi-standby mode means that the terminal device may access a plurality of (at least two) communication service networks, allowing a plurality of communication links to be established from the terminal device to the information management device, and the terminal device may use any one or more of the plurality of communication links when uploading or pulling a data stream. When the terminal device is connected to at least two communication service networks and the terminal device operates in the multi-card multi-standby mode, the terminal device may achieve load balancing by using abundant path resources and bandwidth resources without switching a communication service network. For a data stream, the terminal device may autonomously select a path. A path selection policy may include one or a combination of the following: A path may be selected based on a hash of a source IP address; transmission may be performed on a plurality of paths through polling; and data streams are allocated based on path weights (for example, more data streams are allocated to a path with a larger weight). Such allocation allows data streams to be distributed to different paths for forwarding, to achieve load balancing. To better achieve load balancing, in some embodiments, IP packets with same 5-tuple information (including a source IP address, a source port, a destination IP address, a destination port, and a transport layer protocol) may be grouped to a same stream based on 5-tuple information of IP packets. During data forwarding, different data streams may be transmitted through a plurality of paths based on an algorithm.

In a case that the terminal device (for example, the terminal device 101a) accesses any one of the plurality of communication service networks, the terminal device may switch a currently connected initial communication service network to a target communication service network when a switching condition is met, and transmit detection response information through the target communication service network in response to detection by the gateway device 103, so that the gateway device 103 determines target routing information. In some embodiments, the terminal device may actively switch a communication service network, or may be controlled to switch a communication service network. For example, in a case that network quality of a communication service network accessed by the terminal device 101*a* is poor, the terminal device 101*a* actively performs switching to access another communication service network.

In actual application, communication service networks belong to different service provider objects. The service provider object may be an object or an organization that provides a network service for the terminal device. For example, a communication service network a belongs to a service provider object A. The communication service network is a network that provides a network access service for the terminal device to transmit data between the terminal device and the information management device. A communication service system corresponding to the communication service network may include various network service devices. For example, the network service device may be a base station, a core switch, or a router. In some embodiments, when the communication service network is a core network (for example, a 4G/5G core network), the communication service system may include a base station and a core network element of a corresponding core network. FIG. 1A includes three communication service systems, and three communication service networks corresponding to the three communication service systems are a base station and a core network A of a service provider object A', a base station and a core network B of a service provider object B', and a base station and a core network C of a service provider object C'. In actual application, any communication service network may be a private network provided for an Internet of Things terminal device, and may be configured to specifically transmit data captured by the Internet of Things terminal device or transmit data delivered by the information management device to the Internet of Things terminal device.

The gateway device 103 may serve as a transit device for connecting the terminal device to the information management device 104 through a communication service network. The gateway device 103 may be connected to a plurality of communication service networks to build a plurality of communication links to the information management device 104. To be specific, the terminal device may exchange data with the information management device 104 through any one of the communication service networks. The gateway device 103 may be a dedicated gateway for a public cloud. The gateway device 103 may be configured to detect a network connection status of the terminal device 101*a* to obtain the target routing information and learn of a current network connection status of the terminal device 101*a*.

The information management device 104 is a device that manages data uploaded by the terminal device. Data management performed by the information management device includes but is not limited to: storing raw data uploaded by the terminal device, performing intelligent analysis on the raw data, providing a backup service for data, and the like. The information management device 104 may include one or more of a public cloud and an Internet data center. For example, the information management device 104 may include a dedicated cloud network space built based on a cloud server to provide network services for cloud resources. The information management device 104 may be a server. The server may be an independent physical server, or may be a server cluster or a distributed system that includes a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform, but is not limited thereto. A quantity of servers is not limited in the disclosure.

Based on the foregoing information processing system, the following briefly describes an interaction process between devices in the information processing system. For ease of description, an example in which the terminal device 101*a* is connected to the gateway device 103 through a communication service network corresponding to the communication service system 102*a* is used for exemplary description.

(1) In a case that the gateway device 103 meets a detection condition, for example, the gateway device 103 is powered on, the gateway device 103 detects a network connection status of any terminal device (for example, the terminal device 101*a*) through each connected communication service system. In actual application, the gateway device may transmit detection signaling to the terminal device 101*a* through each communication service system. To be specific, the gateway device may transmit detection signaling to each communication service system, and then the communication service system determines, based on whether the terminal device 101*a* is connected to the communication service system, whether to discard the detection signaling or forward the detection signaling to the terminal device 101*a*.

(2) The terminal device 101*a* receives detection signaling transmitted by a target communication service system (for example, the communication service system 102*a*) of the plurality of communication service systems, and then generates detection response information and transmits the detection response information to the gateway device 103. The detection response information may be a data packet for responding to the detection signaling. In a case that the terminal device 101*a* actively switches or is controlled to switch a currently connected communication service network during detection by the gateway device 103, the terminal device 101*a* cannot receive detection signaling before accessing another communication service network.

(3) The gateway device 103 receives the detection response information transmitted by the terminal device 101*a* through a communication service network accessed by the terminal device 101*a*, and determines target routing information. The target routing information may be used for indicating that the gateway device 103 and the terminal device 101*a* are connected through the communication service system 102*a* that transmits the detection response information. The target routing information may be a downlink route. The downlink route may be a transmission path for the information management device 104 to deliver data to the terminal device 101*a*, and includes logical protocol addresses of the terminal device 101*a* and the connected communication service system 102*a*. A protocol address of the terminal device 101*a* may be a destination address.

(4) Data may be transmitted between the terminal device 101*a* and the information management device 104 based on the target routing information. Because the target routing information may be a downlink route, downlink data transmitted by the information management device 104 may be transmitted to the terminal device 101a based on indication by the target routing information.

In an embodiment, the gateway device 103 may include a dedicated channel and a dedicated gateway that integrates a detection function and an address translation function. On the basis of the foregoing information processing system, another information processing system may be further provided, as shown in FIG. 1B. A difference between the information processing system shown in FIG. 1B and the information processing system shown in FIG. 1A lies in that the gateway device in FIG. 1A may be divided into a dedicated channel and a VPC gateway. The dedicated channel may be configured to connect to a core network of a service provider object. The VPC gateway further has a detection function and an address translation function on the basis of an original function. The VPC gateway may detect a protocol address group of a terminal device through a plurality of (for example, but not limited to, three shown in FIG. 1B) dedicated channels, where the protocol address group includes protocol addresses assigned by a plurality of (for example, but not limited to, three) service provider objects to the terminal device; and record a connectivity status between the terminal device and a communication service system. In some embodiments, the address translation function in the VPC gateway may be implemented as follows: In a case that a source IP address of an uplink packet is an IP address of a core network of a service provider object, the VPC gateway may replace the source IP address of the uplink packet with a virtual intranet IP address. In a case that a destination IP address of a downlink packet is a virtual intranet IP address, the VPC may replace the destination IP address of the downlink packet with an IP address assigned by a current service provider object to the terminal device, and transmit the downlink packet to a corresponding dedicated channel. An IP address of a core network in each communication service system may be masked for the information management device through address translation, so that the VPC gateway manages protocol addresses in a more unified manner. In this information processing system, the foregoing interaction process may be implemented by the VPC gateway in the gateway device.

Both information processing systems may be applied to various scenarios with Internet of Things devices, for example, Internet of Vehicles, smart household, wearable devices, bike sharing, mobile payment, and smart agriculture. A terminal device in the information processing system accesses a plurality of communication service networks through a subscriber identity module used by the terminal device, so that a highly available cellular network connection is provided for the terminal device. The terminal device accesses at least one of the plurality of communication service networks, and the gateway device is also connected to a plurality of communication service systems. In this way, a plurality of communication links can be established for the terminal device to access the information management device, so that the terminal device can ensure continuity of data transmission through another path when the terminal device actively switches or is controlled to switch a communication service network. In some embodiments, the gateway device may be divided into the dedicated channel for connecting to a core network of a service provider object, and the VPC gateway for providing the detection function and the address translation function. In this way, a function for connecting to a communication service system can be decoupled from the detection function.

Based on related descriptions of the foregoing information processing system, the following describes application scenarios of the information processing system, including but not limited to a scenario 1 and a scenario 2.

Scenario 1: A new retail store captures video data through a camera, and transmits the video data back to a public cloud or a customer-built IDC through 4G/5G CPE in a directed manner. The customer may deploy a video analysis tool in the IDC for remote management, store inspection, passenger flow data analysis, fire detection, and the like. A terminal device (equipped with a "multi-card single-standby" Internet of Things card, for example, the foregoing 4G/5G CPE) selects an appropriate communication service network for access based on a network environment of the store, and switches to another communication service system when a currently connected communication service system fails.

Scenario 2: A network-connected screen of a service system that provides passengers with various types of information, namely, a passenger information system (PIS), accesses a public cloud or a customer-built IDC through a 4G/5G network in a directed manner, and periodically pulls real-time arrival information of a bus or a subway train. A terminal device (equipped with a "multi-card single-standby" Internet of Things card, namely, the network-connected screen of the passenger information system herein) selects an appropriate communication service network for access based on a network environment of the terminal device, and switches to another communication service system when a currently connected communication service system fails.

The following describes in detail implementations of information processing methods with reference to the accompanying drawings. The following embodiments include an information processing method described on a gateway device side and an information processing method described on a terminal device side. In some embodiments, information processing methods may be applied to an information processing system (including the information processing system shown in FIG. 1A or FIG. 1B).

FIG. 2 is a first schematic flowchart of an information processing method according to some embodiments. The information processing method may be performed by a gateway device (for example, the gateway device 103 in FIG. 1A), and the information processing method may include the following operations:

S201: Detect a network connection status of a terminal device through each communication service system in a case that a detection condition is met.

The network connection status of the terminal device may be used for indicating whether the terminal device is properly connected to the communication service system. The network connection status of the terminal device may include a normal state and an abnormal state. In a case that the network connection status is the normal state, the terminal device is properly connected to the communication service system. The network connection status may indicate a service provider object to which the terminal device and an accessed communication service network belong. In a case that the network connection status is the abnormal state, a connection between the terminal device and the communication service system is poor (for example, data cannot be transmitted based on a communication service network corresponding to the communication service system). For example, a connection between the terminal device and a communication service system corresponding to a communication service network A is interrupted because a currently accessed communication service network does not cover a movement area of the terminal device. In this case, the terminal device is in an offline state, and the terminal device may go online again by actively switching to a communication service network B. The gateway device may automatically detect a latest network connection status of the terminal device, to be specific, whether the terminal device is properly connected to a communication service system B.

The detection condition is a condition for starting a detection process by the gateway device. In a case that the detection condition is met, detection on the network connection status of the terminal device through each communication service system may be started. The detection condition may be any one or more of the following: The gateway device is powered on; or the terminal device and an information management device have a data exchange requirement. For example, starting of a detection process may be triggered when the information management device actively delivers data to the terminal device. This can ensure, through detection, that the gateway device can obtain latest routing information in a timely manner when the terminal device switches a communication service network, and ensure normal delivery of the data of the information management device.

Detection initiated by the gateway device may be periodic detection. For example, detection is performed every 1 second or every 10 seconds. A value of a detection cycle may determine detection frequency. In some embodiments, the detection initiated by the gateway device may be aperiodic detection. For example, detection is separately performed at the 1st second, the 4th second, and the 6th second. In actual application, in a case that a terminal device is offline (to be specific, does not access any communication service network), to save bandwidth resources, a detection cycle for the terminal device may be prolonged according to a preset adjustment rule. For example, after going offline, the terminal first retains continuous detection for a period of time. When detection times exceed a preset threshold (for example, no response is received after 100 times), the detection cycle may be adjusted to a first detection cycle (which may be set according to an actual requirement, for example, detection is performed every 20 seconds). If a network connection status obtained through periodic detection is still an abnormal state, the first detection cycle may be adjusted to a second detection cycle. In some embodiments, the second detection cycle is greater than the first detection cycle. For example, after the adjustment, detection is performed every 1 minute.

In some embodiments, an implementation of S201 may include: transmitting detection signaling to each communication service system.

In some embodiments, a target receiver of the detection signaling may be the terminal device, and the gateway device may transmit the detection signaling to the terminal device through at least one of a plurality of communication service networks accessed by the gateway device. The detection signaling may be used as detection information transmitted by the gateway device to the terminal device for detecting the network connection status of the terminal device. In actual application, the gateway device may determine the network connection status of the terminal device based on whether the terminal device responds to the detection signaling, and then determine whether the terminal device is in an abnormal state, for example, the terminal device does not access any one of the plurality of communication service networks and therefore is offline.

For any one of the plurality of communication service networks, in a case that the terminal device does not access any communication service network, each communication service system discards the detection signaling; or in a case that the terminal device accesses at least one communication service network, a communication service system corresponding to the accessed communication service network transmits the detection signaling to the terminal device. To be specific, after each communication service system receives the detection signaling transmitted by the gateway device, the communication service system may perform different processing on the detection signaling by determining whether the terminal device establishes a network connection to the communication service system. The processing includes discarding the detection signaling or transmitting the detection signaling to a corresponding terminal device. A plurality of communication service systems include a communication service system that discards the detection signaling and a communication service system that transmits the detection signaling. The communication service system that transmits the detection signaling is a communication service system to which the terminal device is connected, namely, a target communication service system mentioned below, to be specific, a communication service system corresponding to a communication service network accessed by the terminal device.

By accessing the communication service network, the terminal device may obtain a static IP address pre-assigned by a service provider object to the terminal device. The static IP address may be used for logical addressing when the communication service system forwards the detection signaling. To be specific, the communication service system may determine, based on the static IP address, a terminal device to which the detection signaling is to be transmitted. In actual application, the communication service system includes a base station and a core network element of a core network built by a service provider object. Discarding or forwarding of the detection signaling is usually performed by the core network element. In a case that the core network element discards the detection signaling, the detection signaling is not transmitted to the terminal device; otherwise, the detection signaling may be transmitted to the terminal device through a corresponding base station.

In some embodiments, the gateway device may be configured to manage a protocol address pre-assigned by a service provider object to the terminal device, for example, may be an Internet Protocol (IP) address group of the terminal device in a plurality of service provider objects, where the IP address group is a collection of a plurality of IP addresses. The protocol address may be assigned by the service provider object and then indicated to the gateway device, or may be assigned by an interconnection protocol, for example, the Layer Two Tunneling Protocol (L2TP), between the gateway device and the service provider object. The gateway device may continuously detect, for example, ping, the IP address group to determine a communication service network currently used by the terminal device, so as to detect a network connection status of the terminal device. In actual application, in a case that a terminal device uses an IP address pre-assigned by a plurality of service provider objects to the terminal device, a terminal device corresponding to the IP address may receive the detection signaling, and then generate detection response information and transmit the detection response information to the terminal device.

S202: Receive detection response information transmitted by the terminal device through a target communication service network.

In some embodiments, the target communication service network may be a communication service network of the plurality of communication service networks that is accessed by the terminal device. The detection response information received by the gateway device is transmitted by the terminal device through the target communication service network. In some embodiments, the detection response information may be generated by the terminal device after the terminal device receives the detection signaling. The detection response information is response information fed back by the terminal device for the received detection signaling. The detection response information may also be referred to as a detection signaling response. The detection signaling and the detection response information may constitute complete detection on the terminal device. To be specific, in a case that the terminal device receives a message transmitted by the gateway device and responds, it can be considered that detection succeeds, and a detection result indicates that the terminal device can properly perform communication, and then a communication service network accessed by the terminal device is learned. Due to an abnormal network connection between the terminal device and the communication service system, the terminal device may not be able to receive the detection signaling and therefore cannot generate the detection response information, or the terminal device cannot transmit the detection response information to the gateway device after receiving the detection signaling and generating the detection response information. In this case, the gateway device does not receive the detection response information transmitted by the terminal device. In this case, corresponding processing may also be performed. Refer to following descriptions corresponding to FIG. 3A.

S203: Determine target routing information.

In some embodiments, the target routing information may be used for indicating that the gateway device and the terminal device are connected through the target communication service network. The network connection status of the terminal device is indicated by a connection between the gateway device and a target communication service system corresponding to the target communication service network. In some embodiments, the gateway device also receives, through the target communication service network, uplink data reported by the terminal device or downlink data delivered by a service management device.

In an embodiment, an implementation of determining the target routing information may include: obtaining a first protocol address of the target communication service system; obtaining a second protocol address of the terminal device, the second protocol address being a protocol address assigned to the terminal device by a service provider object to which a target communication service network corresponding to the target communication service system belongs; and generating the target routing information based on the first protocol address and the second protocol address, the first protocol address being a next hop in the target routing information, and the second protocol address being a destination address in the target routing information.

Communication service systems provided by different service provider objects may be identified by unique protocol addresses. The protocol address may be an Internet Protocol address (IP address). The first protocol address may be an IP address that logically identifies the target communication service system, for example, a protocol address that represents a core network included in the communication service system. Because the gateway device may be configured to manage a protocol address pre-assigned by each service provider object to the terminal device, the gateway device may obtain a protocol address currently used by the terminal device, namely, the second protocol address. The second protocol address may be an IP address assigned to the terminal device by a service provider object to which a communication service network (namely, the target communication service network) accessed by the terminal device belongs. The target routing information may be generated based on the first protocol address and the second protocol address. To be specific, a next hop in the target routing information is the protocol address of the communication service system, and a destination address in the target routing information is the protocol address of the terminal device. It can be learned that the target routing information is a downlink route, and the gateway device may learn of, based on the downlink route, a path for delivering data to the terminal device.

Usually, there are a massive number of terminal devices accessing a communication service network. A single terminal device may be used as an example for description. For each terminal device, the method described may be used for implementation. In other words, the methods described herein may be equally applied to other ones of the terminal devices that access the communication service network.

In the information processing method provided, the gateway device may automatically detect the network connection status of the terminal device in a case that the detection condition is met, and generate the target routing information after receiving the detection response information transmitted by the terminal device. Because the gateway device actively detects the terminal device, the gateway device can actively detect a communication service network accessed by the terminal device, and obtain accurate routing information in a timely manner when detecting that the terminal device is properly connected to the communication service network. This ensures normal data transmission and service availability.

FIG. 3A is a second schematic flowchart of another information processing method according to some embodiments. The information processing method may be performed by a gateway device (for example, the gateway device 103 shown in FIG. 1A), and may include the following operations:

S301: Detect a network connection status of a terminal device through each communication service system in a case that a detection condition is met.

S302: Determine target routing information in a case that detection response information transmitted by the terminal device through a target communication service network is received.

For implementations of the foregoing operations, refer to the descriptions corresponding to FIG. 2. Details are not described herein again for conciseness. Embodiments described by FIG. 2 include content implemented in a case that the gateway device receives the detection response information transmitted by the terminal device through the target communication service network.

S303: Transmit data between the terminal device and an information management device based on the target routing information.

In some embodiments, S303 may include: receiving downlink data transmitted by the information management device; and in a case that the downlink data is data transmitted to the terminal device, transmitting the downlink data to the terminal device based on a data transmission path indicated by the target routing information.

When the information management device is to deliver data to the terminal device, the gateway device may receive downlink data transmitted by the information management device. The downlink data may be raw data reported by another terminal device to the information management device, for example, audio or video data captured by an intelligent camera, or vehicle traveling information data captured by a network-connected screen of a vehicle. In some embodiments, the downlink data may be analysis data obtained through intelligent analysis based on the raw data, for example, passenger flow data obtained by analyzing captured passenger flow information data. Types of the downlink data include but are not limited to a video, audio, and an image. The downlink data may vary for different application scenarios and requirements. The target routing information may be used for indicating a data transmission path (which may also be referred to as a transmission path). The gateway device may transmit the downlink data to the terminal device through the data transmission path. To be specific, the downlink data is transmitted to the target communication service system, and then the target communication service system transmits the downlink data to the terminal device.

In some embodiments, after the target routing information is determined, in a case that the target routing information is different from initial routing information recorded on the gateway device, the initial routing information recorded on the gateway device may be further adjusted to the target routing information. The initial routing information is used for indicating that the gateway device and the terminal device are connected through an initial communication service network. The initial communication service network is a communication service network to which the terminal device is connected before the terminal device switches to being connected to the target communication service network, that is, a communication service network currently accessed by the terminal device.

The initial routing information recorded on the gateway device is a downlink route, and the downlink route is used as a transmission path for downlink data. A next hop in the initial routing information is a protocol address of the initial communication service network (to be specific, an initial communication service system corresponding to the initial communication service network), and a destination address in the initial routing information is a protocol address of the terminal device. Obviously, a next hop included in the target routing information is different from the next hop included in the initial routing information. The former is a protocol address of the target communication service network, and the latter is the protocol address of the initial communication service network. This difference may be caused by switching from the initial communication service network to the target communication service network. To be specific, the target routing information may be obtained after the terminal device switches from the initial communication service network to the target communication service network. In actual application, the initial routing information may be adjusted to the target routing information. For example, the initial routing information is deleted from the gateway device, and the target routing information is added.

Before the terminal device accesses the target communication service network, a currently accessed initial communication service network may be a communication service network accessed by the terminal device for the first time after the terminal device is powered on or started, or may be a communication service network to which the communication service network accessed for the first time is switched. Before the terminal device starts to switch from the initial communication service network and access the target communication service network, the initial communication service network accessed by the terminal device may be used for data transmission. For example, the initial routing information recorded on the gateway device may be used, and delivered data (data transmitted to the terminal device) transmitted by the information management device and received by the gateway device is transmitted to the terminal device based on a data transmission path indicated by the initial routing information.

A detection process initiated by the gateway device does not affect switching of a communication service network performed by the terminal device. However, switching of a communication service network may affect detection. For example, the gateway device transmits detection signaling after the terminal device is disconnected from the initial communication service network and before the terminal device accesses the target communication service network, and then the gateway device may not receive detection response information. The gateway device may continuously perform detection. For example, the gateway device continues to transmit detection signaling in a case that the gateway device does not receive detection response information within a period of time. In this case, the terminal device accesses the target communication service network, and may respond to the detection signaling, so that the gateway device can receive the detection response information. In some embodiments, in a case that the target routing information is the same as the initial routing information recorded on the gateway device, it indicates that a target communication service network device to which the terminal device is connected is the initial communication service network. To be specific, the initial communication service network accessed by the terminal device is not switched to another communication service network, and the initial routing information may be retained. For an implementation in a case that the gateway device cannot receive the detection response information transmitted by the terminal device, refer to the following S304 and S305.

Figures 3B, 4:
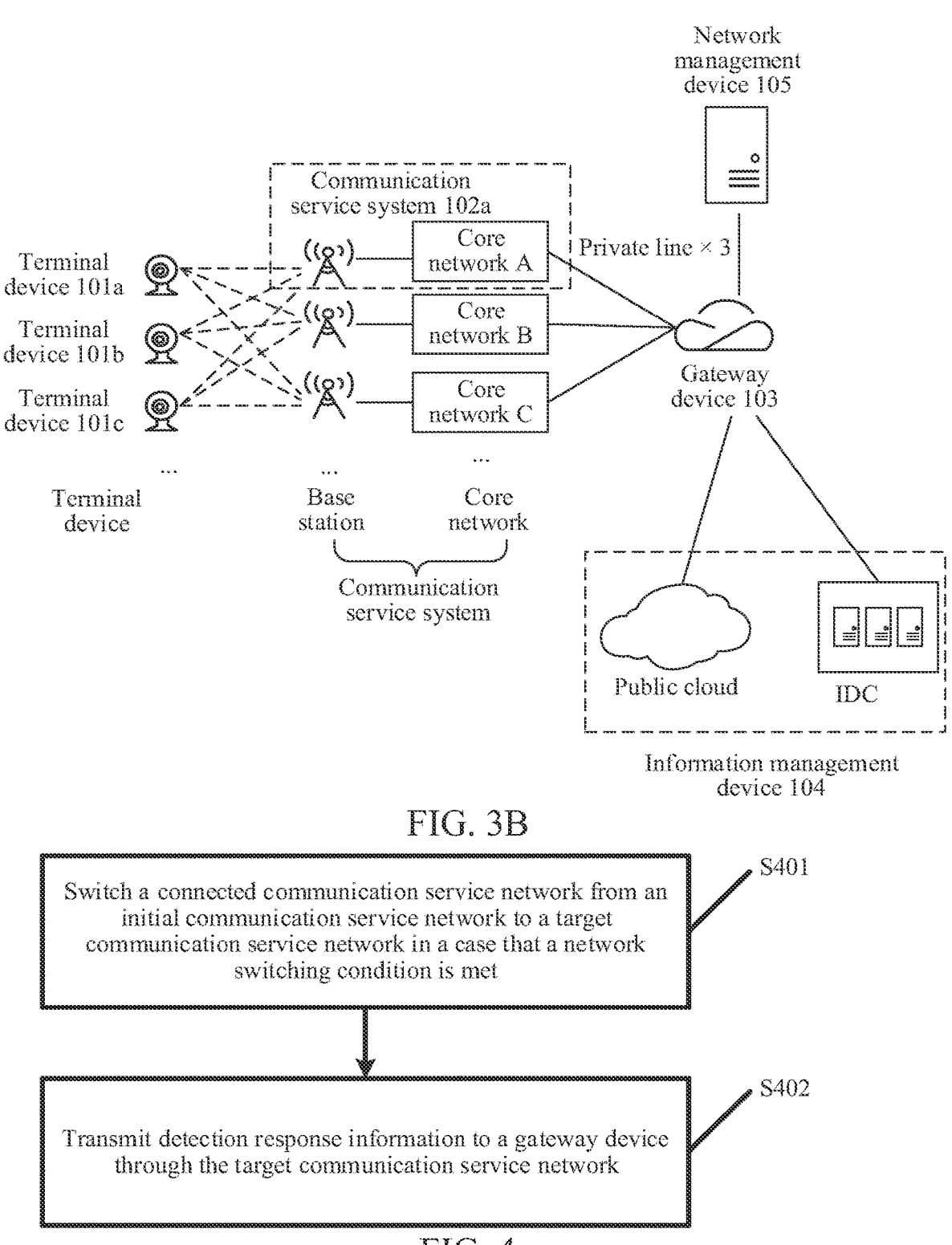
FIG. 3B is an architectural diagram of still another information processing system according to some embodiments.
FIG. 4 is a third schematic flowchart of an information processing method according to some embodiments.

In some embodiments, the information processing system further includes a network management device, and the network management device is connected to the gateway device. The network management device may be connected to the gateway device in a wired or wireless manner. In some embodiments, the network management device may establish a connection to the terminal device through a communication service network. The network management device may be an independent physical server, or may be a server cluster or a distributed system that includes a plurality of physical servers, or may be a cloud server that provides basic cloud computing services such as a cloud service, a cloud database, cloud computing, a cloud function, cloud storage, a network service, cloud communication, a middleware service, a domain name service, a security service, a CDN, big data, and an artificial intelligence platform. The information processing system including the network management device is shown in FIG. 3B.

The network management device is configured to manage the network connection status of the terminal device. In a case that the terminal device is an Internet of Things terminal device, the terminal device accesses a communication service network through an Internet of Things card embedded or inserted in the device, and therefore the network management device may be configured to support operation of an Internet of Things card management platform. Functions provided by the Internet of Things card management platform include but are not limited to: managing a complete life cycle of the Internet of Things terminal device (for example, checking whether the Internet of Things terminal device is online, remotely maintaining the Internet of Things terminal device, deleting the Internet of Things terminal device, and registering the Internet of Things terminal device), and providing data transfer and scenario linkage (for example, transferring data captured by an Internet of Things terminal device a to an Internet of Things terminal device b, or to a cloud server). In some embodiments, the terminal device may actively report the network connection status to the network management device after completing network access or switching a communication service network, and the network management device may deliver a route related to the terminal device to the gateway device through an interface, where the route may be directly used as the target routing information. In this case, the gateway device may not need to detect the target routing information. In some embodiments, whether the terminal device is abnormal may also be checked on the network management device based on the network connection status directly reported by the terminal device.

S304: In a case that no detection response information transmitted by the terminal device is received through any communication service network, determine that the terminal device is in an abnormal state.

In some cases, for example, during a period before the terminal device accesses another communication service network after switching a communication service network, or in a case that the terminal device is faulty, the terminal device may not be able to access any communication service network. In this case, if the gateway device detects the network connection status of the terminal device, for example, transmits detection signaling to the terminal device through each communication service network, the terminal device cannot receive the detection signaling because the terminal device has not accessed a communication service network or the device is faulty. Therefore, the gateway device cannot receive detection response information transmitted by any one of the plurality of communication service systems. In this case, it is determined that the terminal device accesses no communication service network, and it is determined that the terminal device is in an abnormal state. The abnormal state indicates that the terminal device may be faulty and cannot access a communication service network. More generally, the terminal device is in an offline state.

In actual application, a condition for determining that the terminal device is in an abnormal state may be: No detection response information transmitted by the terminal device through any communication service network is received within preset time, or no detection response information transmitted by the terminal device through any communication service network is received after a preset quantity of times of detection is performed. By setting the determining condition, a case that no detection response information is received during switching by the terminal device and the terminal device is determined as being in an abnormal state can be avoided.

In some embodiments, in a case that no detection response information transmitted by the terminal device through any communication service network is received, the initial routing information recorded on the gateway device may be further deleted. For example, in a process in which the terminal device starts to switch from a communication service network A to a communication service network B, the terminal device and each communication service system are in a disconnected state, and each communication service system discards detection signaling. Consequently, the terminal device cannot receive the detection signaling, and cannot transmit detection response information to the gateway device in response to detection by the gateway device. In this case, the initial routing information recorded on the gateway device may be deleted.

S305: Report the abnormal state of the terminal device to the network management device.

When detecting that the terminal device is in the abnormal state, the gateway device may report the abnormal state of the terminal device to the network management device, so that a status of the terminal device can be queried on a platform supported by the network management device. In a case that this application is applied to an Internet of Things scenario, the terminal device may be any Internet of Things terminal device. Because the Internet of Things terminal device is quite important for transmitting and receiving messages, it is useful to detect whether the Internet of Things terminal device is in an abnormal state. A status of the terminal device may be reported to implement remote management, which is quite convenient.

In some embodiments, in a case that detection response information transmitted by the terminal device through the target communication service network is received, the target routing information is determined, the terminal device is determined as being in a normal state, and the gateway device may also actively report the normal state of the terminal device to the network management device. In this way, a normal or abnormal state of the terminal device can be viewed at any time on a management platform supported by the network management device, to manage a real-time status of the terminal device.

Sequence numbers of the operations do not constitute a limitation on an execution sequence. For related implementations, for example, S302-S303 and S304-S305 are two parallel solutions.

It can be learned that the gateway device detects the network connection status of the terminal device, and determines the target routing information in a case that the terminal device is properly connected to a communication service system. In a case that the target routing information is different from previously recorded routing information, routing information managed by the gateway device may be updated, and downlink data of the information management device is transmitted to a corresponding terminal device based on a data transmission path indicated by the target routing information, to ensure normal data transmission and service continuity and availability. In some embodiments, the gateway device may further determine whether the terminal device is in an abnormal state based on whether detection response information is received during detection, and actively report a status of the terminal device to implement real-time management on a network connection status between the terminal device and the communication service system. In some embodiments, convenience of remote management can be provided through the network management device.

FIG. 4 is a third schematic flowchart of another information processing method. The information processing method may be performed by a terminal device (for example, the terminal device 101a shown in FIG. 1A), and may include the following operations:

S401: Switch a connected communication service network from an initial communication service network to a target communication service network in a case that a network switching condition is met.

Because the terminal device has a capability of accessing a plurality of communication service networks, the terminal device may switch a communication service system to which the terminal device is connected, to switch a currently connected initial communication service system to a target communication service system, that is, switch a currently accessed initial communication service to a target communication service. The initial communication service network and the target communication service network are different communication service networks of the plurality of communication service networks. The initial communication service network may be a communication service network accessed by the terminal device for the first time, or may be a communication service network accessed by the terminal device not for the first time (to be specific, a new communication service network to which a last accessed communication service network is switched). The capability of the terminal device to access the plurality of communication service networks is provided by a subscriber identity module in the terminal device. Refer to the foregoing descriptions of the information processing system.

The network switching condition is a condition for switching a communication service network currently accessed by the terminal device. Whether the switching condition is met may be determined by the terminal device automatically or under control. For example, the terminal device may be triggered to actively switch the communication service network in a case that network congestion for the terminal device reaches a preset time threshold, a link is interrupted due to a failure of a communication service system, or the like.

In some embodiments, the terminal device may be controlled to switch a currently connected initial communication service network. Specific implementation operations include: in a case that an input network switching instruction is detected, determining that the network switching condition is met; and in response to the network switching instruction, switching the accessed communication service network from the currently connected initial communication service network to a target communication service network indicated by the network switching instruction.

The network switching instruction is used for indicating to switch from the initial communication service network currently accessed by the terminal device to the target communication service network. The network switching instruction may be generated by manually operating the terminal device to perform network switching. For example, the network switching instruction is generated by a remote operation of adjusting a communication service network N1 accessed by the terminal device to a communication service network N2. In a case that the terminal device detects the network switching instruction, the terminal device may determine that the switching condition is met. Therefore, in response to the network switching instruction, the terminal device may switch the initial communication service network currently accessed by the terminal device to the target communication service network indicated by the network switching instruction.

In some embodiments, the terminal device may actively switch a currently connected initial communication service network. Implementation operations include: obtaining a network parameter between the terminal device and an initial communication service system (to be specific, a communication service system corresponding to the initial communication service network) to which the terminal device is currently connected; in a case of determining, based on the network parameter, that the terminal device and the initial communication service system are in a target network state, determining that the network switching condition is met; determining the target communication service network from the plurality of communication service networks, the target communication service network being different from the initial communication service network; and switching an accessed communication service network from the initial communication service network to the target communication service network.

The network parameter may be used for determining a network status between the terminal device and the initial communication service system to which the terminal device is currently connected. The network status may indicate whether the terminal device is well connected to a communication service network currently accessed by the terminal device. The terminal device and the currently connected initial communication service system are in the target network state. The target network state may be: The terminal device and the initial communication service system are in a disconnected state; or connection quality between the terminal device and the initial communication service system deteriorates, and in this case, the terminal device may perform link reselection: determining a communication service network from the plurality of communication service networks as a target communication service network. In actual application, the switch-to target communication service network may be determined according to a preset selection policy, for example, network quality of a communication service network or a preference for a service provider object, and then the initial communication service network to which the terminal device is connected is switched to the target communication service network.

For example, the initial communication service network is the communication service network N1, and the target communication service network is the communication service network N2. Due to a network failure of the communication service network N1, the terminal device cannot access the Internet after accessing the communication service network. In some embodiments, the terminal device finds through a quality detection means (a policy for detecting connection quality of a communication service network) that the currently accessed communication service network N1 is disconnected. In this case, the terminal device may actively switch from the communication service network N1 to the communication service network N2, and transmit uplink data to an information management device through a communication service system corresponding to the communication service network N2.

In some embodiments, in a case that the terminal device initially accesses a communication service network after power-on, the terminal device may determine an accessible communication service network according to a preset selection policy, for example, quality of each communication service network or a selection preference. After accessing the communication service network, the terminal device may transmit uplink data to a server (for example, the information management device) by using the communication service network.

S402: Transmit detection response information to a gateway device through the target communication service network.

The detection response information is used for indicating the gateway device to determine target routing information based on a transmission path of the detection response information. The detection response information is generated and transmitted by the gateway device in a process of detecting a network connection status of the terminal device through each communication service network. The detection response information is response information fed back by the terminal device for detection performed by the gateway device on the network connection status of the terminal device through each communication service network.

In other words, before this operation, the terminal device may further perform the following content: receiving detection signaling transmitted by the gateway device through the target communication service network; and generating the detection response information based on the detection signaling.

The detection signaling is transmitted by the gateway device to each communication service system in a case that a detection condition is met. In a case that the detection condition is met, the gateway device may transmit the detection signaling to each communication service system in a process of detecting the network connection status of the terminal device. In a case that the initial communication service network to which the terminal device is connected is switched to the target communication service network, the detection signaling may be transmitted to the terminal device by a target communication service system corresponding to the target communication service network. After receiving the detection signaling, the terminal device generates the detection response information corresponding to the detection signaling.

After generating the detection response information, the terminal device may transmit the detection response information to the gateway device through the target communication service system that transmits the detection signaling. In this way, the gateway device can determine the target routing information based on the transmission path of the detection response information. The transmission path of the detection response information is used for indicating a source of the detection response information and a communication service network through which the detection response information passes. In actual application, in the transmission path, a source address (to be specific, a first protocol address of the terminal device) for transmitting the detection response information may be used as a destination address in the target routing information, and a next hop (to be specific, a second protocol address of the target communication service network) for transmitting the detection response information is used as a next hop in the target routing information.

In the information processing solution provided, the terminal device has a capability of accessing at least one of the plurality of communication service networks, and the gateway device may be connected to a communication service system and an information management device of each of a plurality of service provider objects. In this way, a plurality of end-to-end equivalent communication links can be provided. The terminal device may switch to another communication service network to switch a path and ensure service availability in a case that congestion, signal fading, a network failure, or the like occurs in a network currently accessed by the terminal device, affects a network connection status between the terminal device and a communication service system, and causes disconnection between the terminal device and the communication service system, that is, in a case that a current path fails. In some embodiments, during switching, an active detection function of the gateway device can further ensure continuity of an accessed communication service network.

Based on the descriptions of the foregoing solution, the following describes in detail an interaction process for all sides based on an information processing system. A signaling process of initially accessing a communication service network by a terminal device and a signaling process of performing link reselection by the terminal device in a case that network congestion, signal fading, a network failure, or the like causes interruption or obvious quality deterioration of a communication link are included.

For ease of description, it is assumed that a terminal device is an Internet of Things terminal U1, a communication service network includes communication service networks of two service provider objects, to be specific, a base station A11 and a core network A12 provided by a service provider object A, and a base station B11 and a core network B12 provided by a service object B, a gateway device may be a dedicated gateway, an information management device includes a public cloud or an IDC, and detection response information may be a detection signaling response.

Figure 5A:
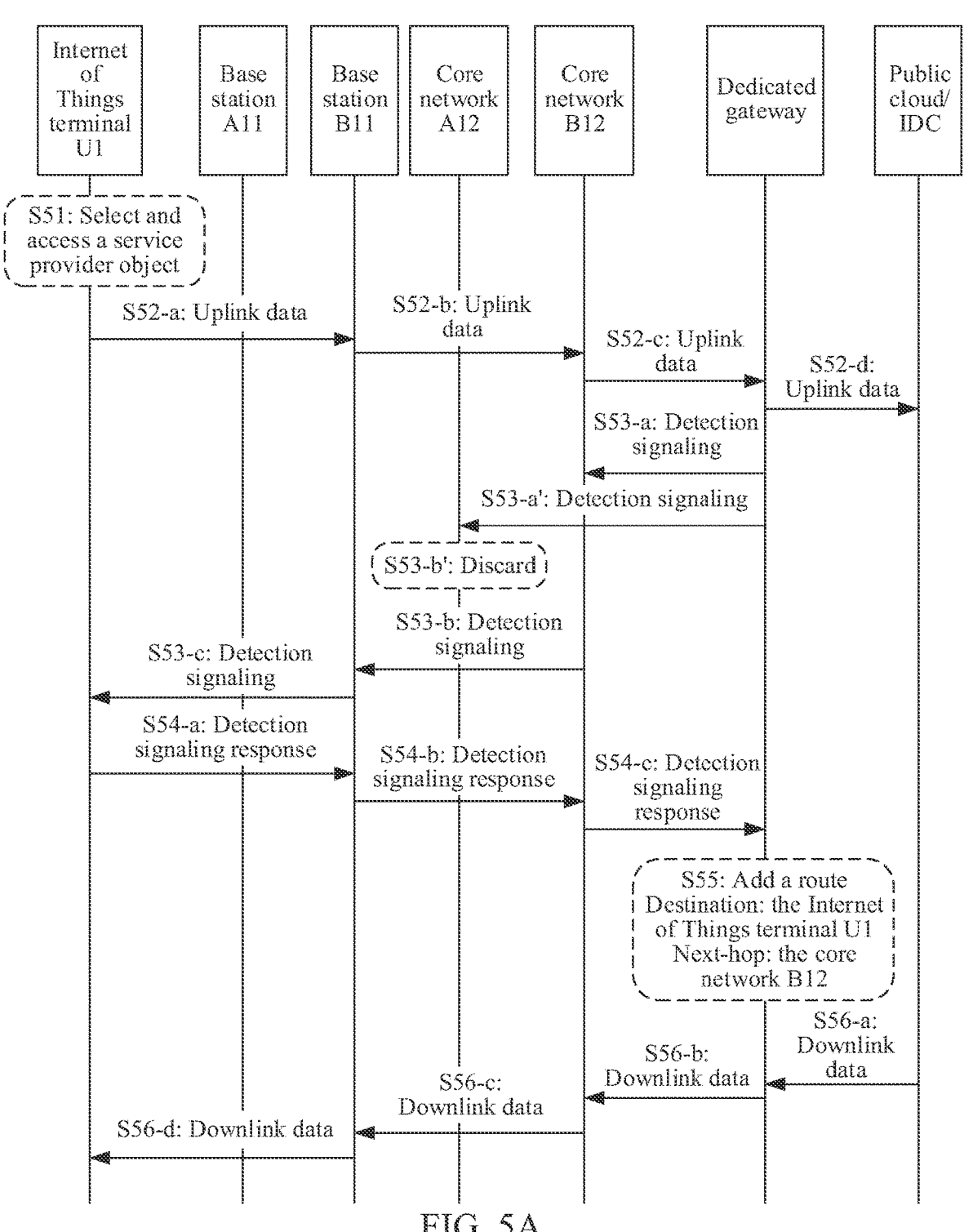
FIG. 5A is an interaction flowchart in which a terminal device initially accesses a communication service network according to some embodiments.

FIG. 5A is an interaction flowchart in which a terminal device initially accesses a communication service network. S51 to S56 are included.

S51: After being powered on, the Internet of Things terminal U1 selects a current service provider object (a communication service network provided by the service provider object may be selected) according to a preset policy, for example, network quality of a communication service network provided by a service provider object or a preference for a service provider object, complete attachment and registration according to a 3GPP standard process, and obtain a pre-assigned static IP address.

S52: After access is completed, the Internet of Things terminal U1 may transmit uplink data to the public cloud or the IDC. The uplink data may be transmitted to the public cloud or the IDC through the gateway device and a communication service network currently used by the Internet of Things terminal U1. After the access is completed, the Internet of Things terminal may or may not transmit uplink data, but the dedicated gateway may still transmit detection signaling to the terminal device subsequently. That is, transmitting or not transmitting uplink data does not interfere with a detection process. This operation is not necessarily performed, and an execution sequence is not limited by sequence numbers of the operations. To be specific, this operation may be performed during detection (for example, after S53) or after detection is completed (for example, after S55).

S53: The dedicated gateway transmits detection signaling to the Internet of Things terminal U1 through a communication service network to which the dedicated gateway is connected. For the service provider object A with which the Internet of Things terminal is not registered, the core network A12 of the service provider object A discards the detection signaling, and the core network B12 of the service provider object B forwards the detection signaling to the Internet of Things terminal U1 through the base station B11. A service provider (that is, an owner of the dedicated gateway) may manage an IP address group pre-assigned by a service provider object to the Internet of Things terminal, and therefore may detect the IP address group and record a connectivity status between the terminal device and a communication service system. A plurality of corresponding virtual routes may be created based on the IP address group, and the detection signaling may be transmitted based on the virtual routes. Then an actual route is determined from the virtual routes after a detection signaling response is received, that is, S54 and S55 are performed.

S54: The Internet of Things terminal U1 transmits a detection signaling response after receiving the detection signaling. To be specific, the detection signaling response is transmitted to the base station B11, and then the base station B11 transmits the detection signaling response to the dedicated gateway through the core network B12.

S55: After receiving the detection signaling response, the dedicated gateway adds a route, where a destination is a next hop of the Internet of Things terminal U1 and is the core network B12 corresponding to the service provider object B. In actual application, a destination address in the route is an IP address corresponding to the Internet of Things terminal U1, and a next hop in the route is a protocol address of the core network B12 corresponding to the service provider object B. The route added after the detection is ready for transmission of downlink data. Content of S56 may be performed in a case that data is to be transmitted.

S56: The dedicated gateway forwards downlink data of the public cloud or the IDC to the core network B12 provided by the service provider object B, and then the core network B12 transmits the downlink data to the Internet of Things terminal U1 through the base station B11. Herein, this operation is not immediately or necessarily performed. To be specific, the public cloud or the IDC may not transmit downlink data.

Figure 5B:
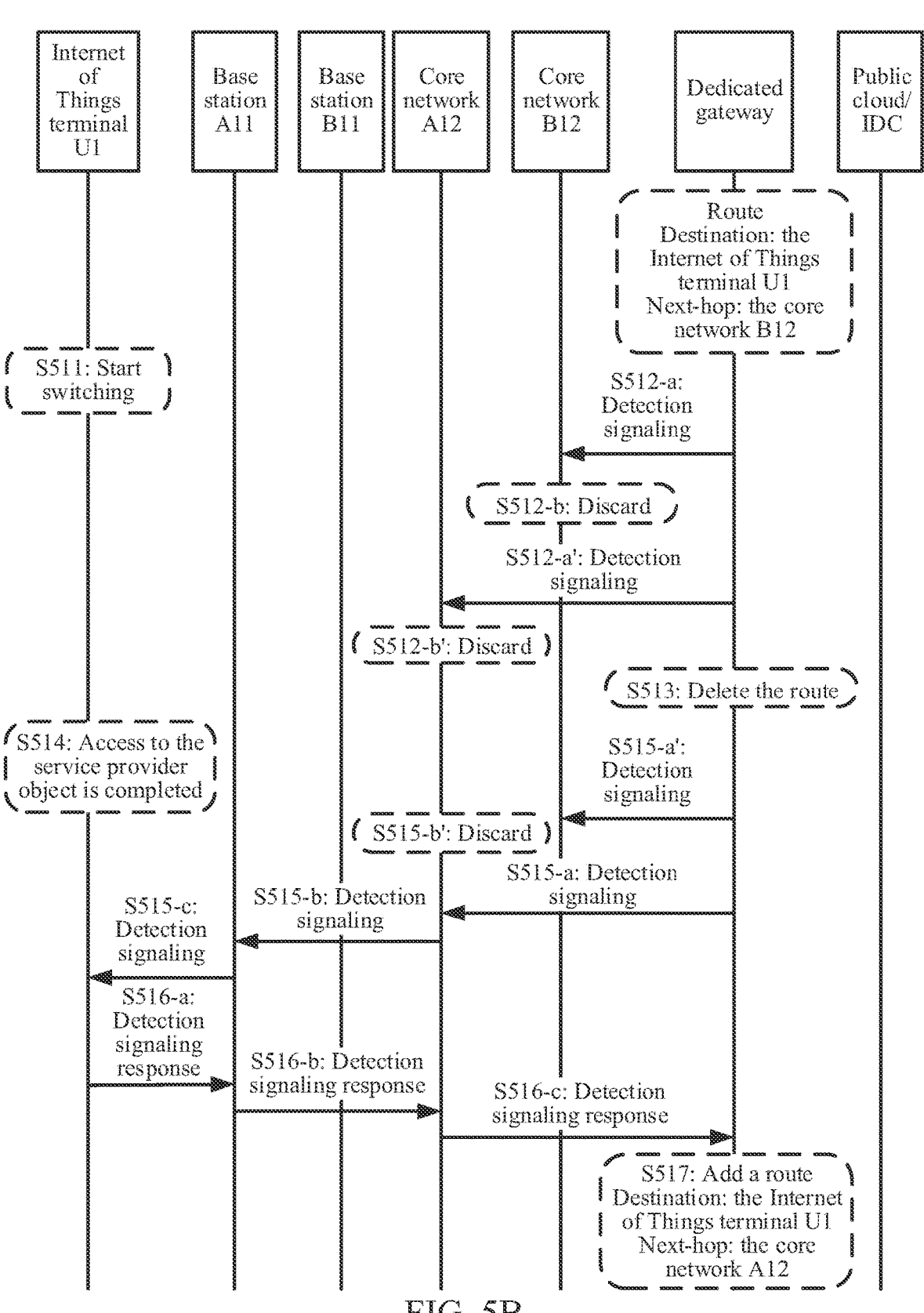
FIG. 5B is a flowchart of signaling interaction included in link reselection performed by a terminal device according to some embodiments.

FIG. 5B is a flowchart of signaling interaction included in link reselection performed by a terminal device. As shown in FIG. 5B, S511 to S517 are included. The dedicated gateway includes a route related to the Internet of Things terminal U1, and a next hop is directed to the core network A12 in the communication service system.

S511: The Internet of Things terminal U1 actively starts or is controlled to start network switching, and is disconnected from a communication service network of the service provider object B.

For example, a communication service network accessed by the Internet of Things terminal U1 may be disconnected due to disconnection between the Internet of Things terminal U1 and the base station B11.

S512: The dedicated gateway transmits detection signaling to the Internet of Things terminal U1 through a communication service network accessed by the dedicated gateway. Because the Internet of Things terminal U1 is not registered with any communication service system, a core network (including the core network A12 and the core network B12) of each service provider object discards the detection signaling. Consequently, the dedicated gateway cannot receive a detection signaling response. This operation is not necessarily performed in a case that the detection signaling is transmitted periodically. To be specific, the detection signaling may be transmitted after the access is completed.

S513: The dedicated gateway deletes the route related to the Internet of Things terminal U1.

Herein, based on the communication service network accessed by the Internet of Things terminal U1 in FIG. 5A, a route whose destination is the Internet of Things terminal U1 and whose next hop is the core network B12 is deleted.

S514: The Internet of Things terminal U1 completes attachment and registration according to a 3GPP standard process, and accesses a communication service network provided by the service provider object A.

For example, the Internet of Things terminal U1 may be connected to the base station A11 to access the core network A12.

S515: The dedicated gateway continues to transmit detection signaling to the Internet of Things terminal U1 through the communication service network accessed by the dedicated gateway. For the service provider object B with which the Internet of Things terminal is not registered, the core network B12 of the service provider object B discards the detection signaling, and the service provider object A forwards the detection signaling to the Internet of Things terminal U1 through the base station A11.

S516: The Internet of Things terminal U1 transmits a detection signaling response after receiving the detection signaling. To be specific, the detection signaling response is transmitted to the base station A11, and then the base station A11 transmits the detection signaling response to the dedicated gateway through the core network A12.

S517: After receiving the detection signaling response, the dedicated gateway adds a route, where a destination is a next hop of the Internet of Things terminal U1 and is the core network A12 corresponding to the service provider object A. To be specific, a destination address in the route is an IP address corresponding to the Internet of Things terminal U1, and a next hop in the route is an IP address corresponding to the core network A12.

The interaction flowcharts shown in FIG. 5A and FIG. 5B may be applied to the information processing system shown in FIG. 1A or FIG. 1B. A difference between application in the information processing system shown in FIG. 1B and application in the information processing system shown in FIG. 1A lies in that data (for example, the uplink data, the detection signaling, the detection signaling response, and the downlink data) transmitted and received by the VPC included in the gateway device in the information processing system shown in FIG. 1B is forwarded through a dedicated channel connected to a communication service network accessed by the terminal device.

To describe effects of the information processing system and the information processing method, the following describes two architectures.

Figures 6A, 6B:
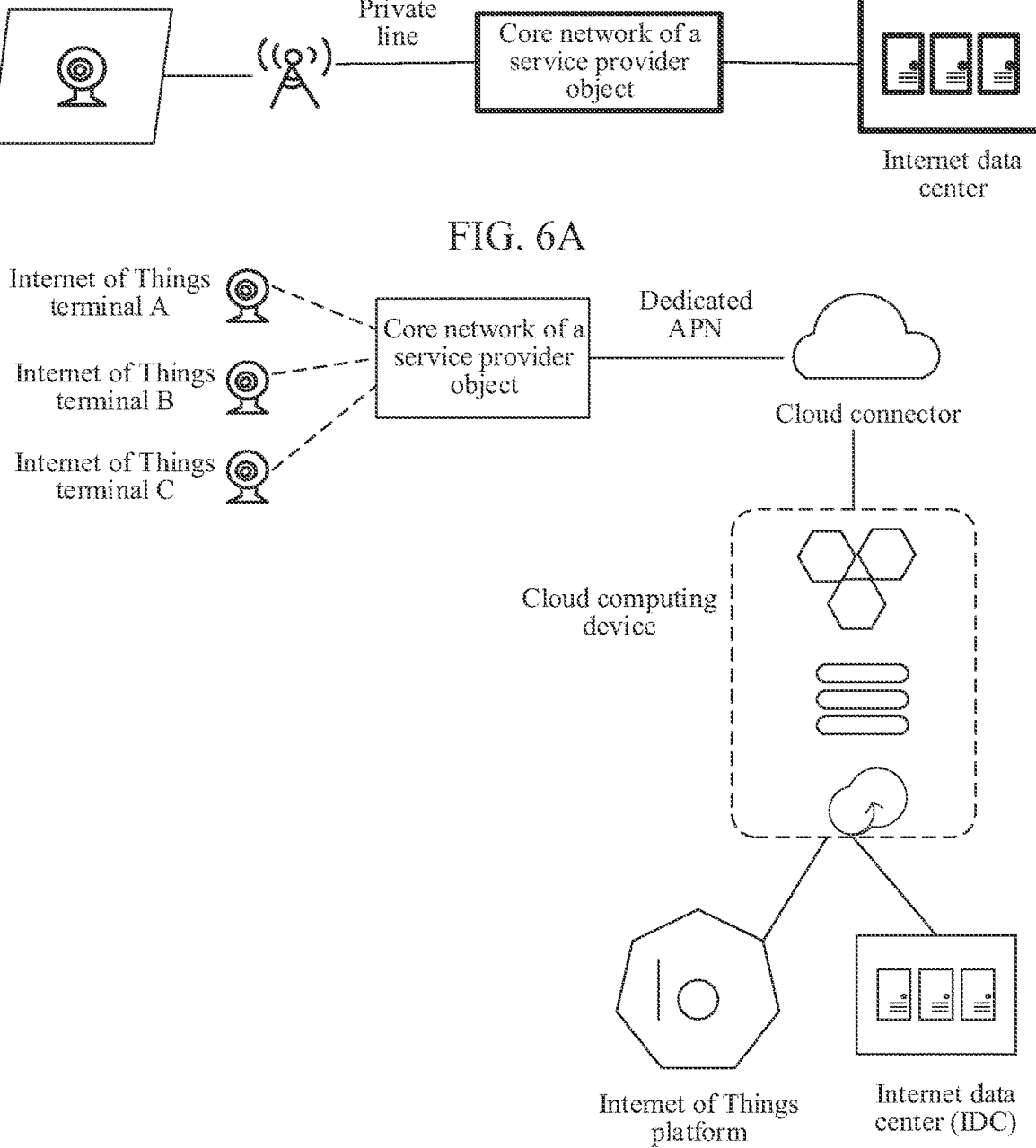
FIG. 6A is a schematic diagram of a virtual private Internet of Things network according to some embodiments according to some embodiments.
FIG. 6B is a schematic diagram of another virtual private Internet of Things network according to some embodiments.

FIG. 6A is a schematic diagram of a virtual private Internet of Things network. As shown in FIG. 6A, a service provider object is connected to an IDC of a customer through an APN or DNN private line, and provides, based on an isolation property of an APN or a DNN, a private network for an Internet of Things terminal in a 4G or 5G network of the customer to access the IDC in a directed manner. FIG. 6B is a schematic diagram of another virtual private Internet of Things network. A core network of a service provider object is connected to a server (including an Internet of Things platform and an IDC) through a cloud connector, and the cloud connector and the core network of the service provider object are isolated by a dedicated APN. However, in this manner, the cloud connector provides an access capability only for a single service provider object, and only one Internet of Things card can be inserted in the Internet of Things terminal to access cloud resources and a customer-built IDC through the cloud connector in a directed manner. In a case that the Internet of Things terminal expects to switch to another service provider object, another Internet of Things card may to be inserted in the Internet of Things terminal in replacement.

It can be learned that the foregoing two types of virtual private Internet of Things networks provide an access capability only for a single service provider object. In a case that a selected service provider object has a coverage blind area or network congestion in a movement area of a terminal device and the terminal device does not have a capability of switching a communication service network, the terminal device cannot access the Internet, bandwidth decreases, or a connection is interrupted. In a case that a base station, a bearer network, or a core network fails, the terminal device cannot access a cloud or an IDC either.

However, in the information processing system provided and the information processing method applied to the information processing system, a subscriber identity module in a multi-card single-standby mode may be used in a terminal device, so that the terminal device can access at least one of a plurality of communication service networks. Then a highly available cellular network connection may be provided for the terminal device through communication service networks provided by different service provider objects, to cover a movement area of the terminal device as much as possible. In some embodiments, the terminal device is provided with a capability of accessing a plurality of service provider objects, and a gateway device is connected to an information management device (for example, a public cloud or a customer IDC) and communication service networks of a plurality of service provider objects. Therefore, a plurality of end-to-end equivalent paths can be provided. In a case that a service provider object fails or the terminal device enters a blind area of network coverage, disaster recovery across service provider objects can be implemented based on the plurality of equivalent paths, to ensure service continuity. In an Internet of Things scenario, the information processing system includes a highly available virtual private Internet of Things network that can provide reliable backup links to ensure service continuity.

Figures 7A, 7B:
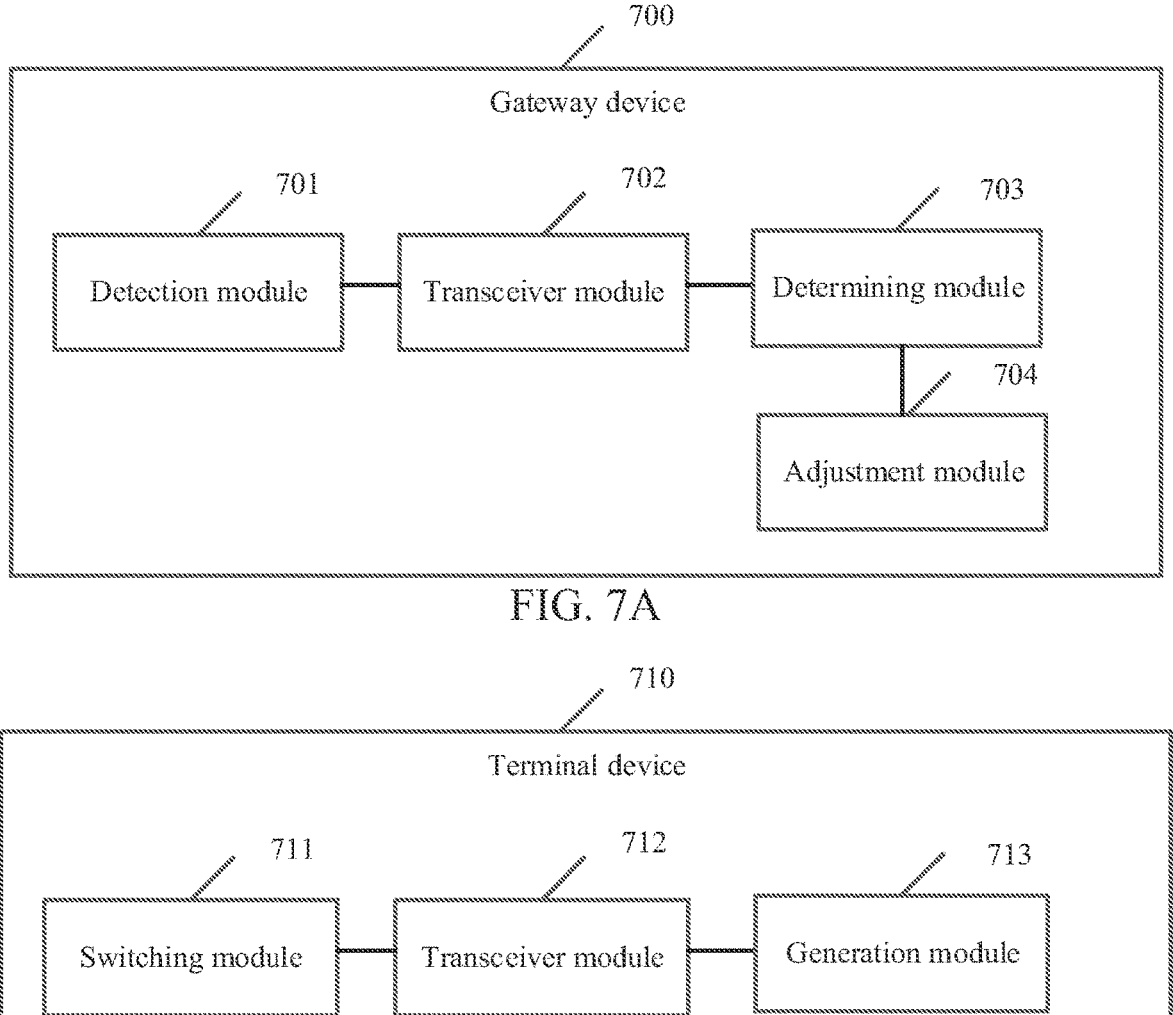
FIG. 7A is a schematic structural diagram of a gateway device according to some embodiments.
FIG. 7B is a schematic structural diagram of a terminal device according to some embodiments.

FIG. 7A is a schematic structural diagram of a gateway device. The gateway device may be a computer device, and a computer program (including program code) runs on the gateway device. For example, application software is configured on the gateway device, and the application software may be configured to perform corresponding operations in the method provided. As shown in FIG. 7A, the gateway device 700 may include a detection module 701, a transceiver module 702, a determining module 703, and an adjustment module 704.

The gateway device 700 is included in an information processing system. The information processing system further includes a terminal device, a plurality of communication service systems, and an information management device. Each communication service system corresponds to a communication service network, and a plurality of communication service networks correspond to different service provider objects. The gateway device is connected to each communication service system and is connected to the information management device.

The detection module 701 is configured to detect a network connection status of the terminal device through each communication service system in a case that a detection condition is met.

The transceiver module 702 is configured to receive detection response information transmitted by the terminal device through a target communication service network, the target communication service network being a communication service network of the plurality of communication service networks that is accessed by the terminal device.

The determining module 703 is configured to determine target routing information, the target routing information being used for indicating that the gateway device and the terminal device are connected through the target communication service network.

In embodiments, the detection module 701 is further configured to transmit detection signaling to each communication service system, a target receiver of the detection signaling being the terminal device. For any one of the plurality of communication service networks, in a case that the terminal device is not connected to any communication service network, the communication service system discards the detection signaling. In a case that the terminal device accesses at least one communication service network, a communication service system corresponding to the accessed communication service network transmits the detection signaling to the terminal device. The detection response information is generated by the terminal device after the terminal device receives the detection signaling.

In some embodiments, the determining module 703 is configured to: obtain a first protocol address of the target communication service network; obtain a second protocol address of the terminal device, the second protocol address being a protocol address assigned to the terminal device by a service provider object to which the target communication service network belongs; and generate the target routing information based on the first protocol address and the second protocol address, the first protocol address being a next hop in the target routing information, and the second protocol address being a destination address in the target routing information.

In some embodiments, the transceiver module 702 is further configured to: receive downlink data transmitted by the information management device; and in a case that the downlink data is data transmitted to the terminal device, transmit the downlink data to the terminal device based on a data transmission path indicated by the target routing information.

In some embodiments, the information processing system further includes a network management device, the network management device is connected to the gateway device, and the transceiver module 702 is further configured to: in a case that no detection response information transmitted by the terminal device is received through any communication service network, determine that the terminal device is in an abnormal state; and report the abnormal state of the terminal device to the network management device.

In some embodiments, the gateway device 700 further includes the adjustment module 704, configured to: in a case that the target routing information is different from initial routing information recorded on the gateway device, adjust the initial routing information recorded on the gateway device to the target routing information, the initial routing information being used for indicating that the gateway device and the terminal device are connected through an initial communication service network, and the initial communication service network being a communication service network to which the terminal device is connected before the terminal device switches to being connected to the target communication service network.

It can be understood that functions of functional modules of the gateway device described may be implemented according to the method in the foregoing method embodiments. For a specific implementation process thereof, refer to related descriptions in the foregoing method embodiments. Details are not described herein again. Beneficial effects of the same method are not described herein again for conciseness.

FIG. 7B is a schematic structural diagram of a terminal device. The terminal device may be a computer device, and a computer program (including program code) may run on the terminal device. For example, application software may be configured on the terminal device, and the application software may be configured to perform corresponding operations in the method provided. As shown in FIG. 7B, the terminal device 710 may include a switching module 711, a transceiver module 712, and a generation module 713.

The terminal device 710 is included in an information processing system. The information processing system further includes a plurality of communication service systems, a gateway device, and an information management device. Each communication service system corresponds to a communication service network, and a plurality of communication service networks correspond to different service provider objects. The gateway device is connected to each communication service system and is connected to the information management device.

The switching module 711 is configured to switch an accessed communication service network from an initial communication service network to a target communication service network in a case that a network switching condition is met, the initial communication service network and the target communication service network being different communication service networks of a plurality of communication service networks.

The transceiver module 712 is configured to transmit detection response information to the gateway device through the target communication service network, the detection response information being used for indicating the gateway device to determine target routing information based on a transmission path of the detection response information, and the detection response information being generated and transmitted by the gateway device in a process of detecting a network connection status of the terminal device through each communication service network.

In some embodiments, the switching module 711 is further configured to: in a case that an input network switching instruction is detected, determine that the network switching condition is met; and in response to the network switching instruction, switch the accessed communication service network from the currently connected initial communication service network to a target communication service network indicated by the network switching instruction.

In some embodiments, the switching module 711 is further configured to: obtain a network parameter between the terminal device and the initial communication service network to which the terminal device is currently connected; in a case of determining, based on the network parameter, that the terminal device and the initial communication service network are in a target network state, determine that the network switching condition is met; determine the target communication service network from the plurality of communication service networks, the target communication service network being different from the initial communication service network; and switch the connected communication service network from the initial communication service network to the target communication service network.

In some embodiments, the terminal device further includes the generation module 713. The transceiver module 712 is further configured to receive detection signaling transmitted by the gateway device through the target communication service network, the detection signaling being transmitted by the gateway device to each communication service system in a case that a detection condition is met; and the generation module 713 is configured to generate the detection response information based on the detection signaling.

It can be understood that functions of functional modules of the terminal device described may be implemented according to the method in the foregoing method embodiments. For a specific implementation process thereof, refer to related descriptions in the foregoing method embodiments. Details are not described herein again for conciseness. Beneficial effects of the same method are not described herein again.

Figures 8A, 8B:
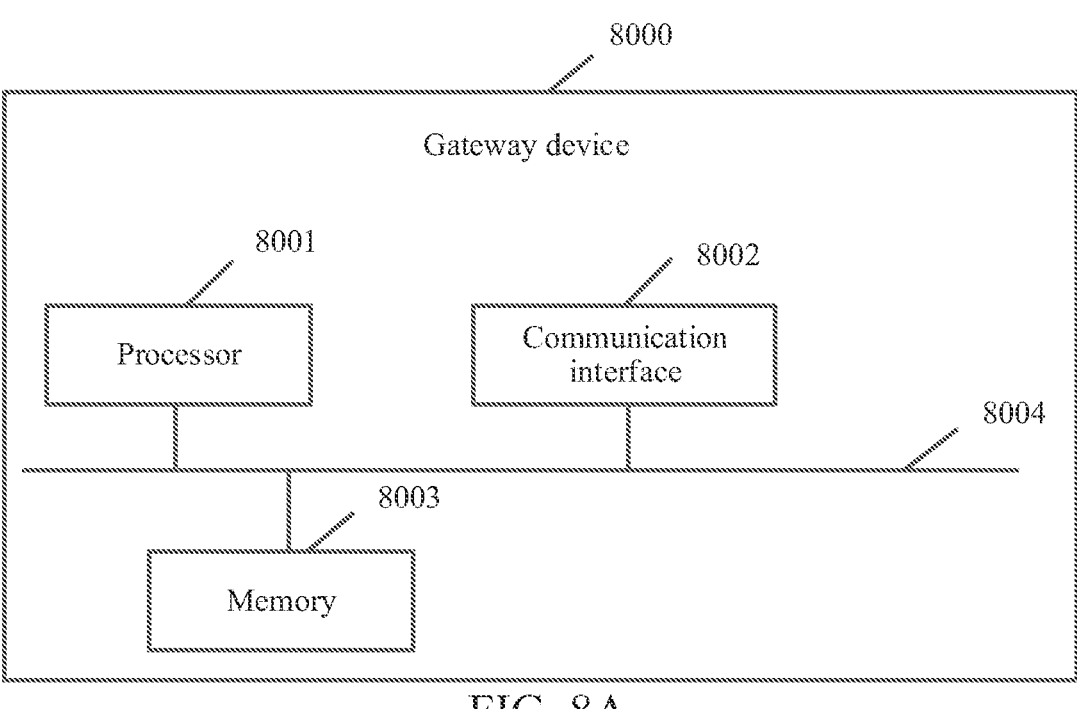
FIG. 8A is a schematic structural diagram of a gateway device according to some embodiments.
FIG. 8B is a schematic structural diagram of a terminal device according to some embodiments.

FIG. 8A is a schematic structural diagram of a gateway device. The gateway device 8000 may include an independent device (for example, one or more of a server, a node, a terminal, or the like), or may include an internal component (for example, a chip, a software module, or a hardware module) of an independent device. The gateway device 8000 may include at least one processor 8001 and a communication interface 8002. In actual application, the gateway device 8000 may further include at least one memory 8003 and a bus 8004. The processor 8001, the communication interface 8002, and the memory 8003 are connected through the bus 8004.

The processor 8001 is a module for performing an arithmetic operation and/or a logic operation, and may be one or a combination of processing modules such as a central processing unit (CPU), a graphics processing unit (GPU), a microprocessor unit (MPU), an application-specific integrated circuit (ASIC), a field programmable gate array (FPGA), a complex programmable logic device (CPLD), a coprocessor (assisting the central processing unit in corresponding processing and application), and a microcontroller unit (MCU).

The communication interface 8002 may be configured to provide information input or output for the at least one processor; and/or the communication interface 8002 may be configured to receive data transmitted from an external environment and/or transmit data to an external environment. The communication interface 8002 may be an interface of a wired link, including an Ethernet cable or the like; or may be an interface of a wireless link (Wi-Fi, Bluetooth, universal wireless transmission, an on-board short-range communication technology, or another short-range wireless communication technology). In this application, the communication interface may serve as a network interface.

The memory 8003 is configured to provide storage space, and the storage space may store data such as an operating system and a computer program. The memory 8003 may be one or a combination of a random access memory (RAM), a read-only memory (ROM), an erasable programmable read-only memory (EPROM), a compact disc read-only memory (CD-ROM), and the like.

The at least one processor 8001 in the gateway device 8000 is configured to invoke the computer program stored in the at least one memory 8003, to perform the foregoing information processing method, for example, the information processing method shown in FIG. 2 or FIG. 3A.

FIG. 8B is a schematic structural diagram of a terminal device. The terminal device 8100 may include an independent device (for example, one or more of a server, a node, a terminal, or the like), or may include an internal component (for example, a chip, a software module, or a hardware module) of an independent device. The terminal device 8100 may include at least one processor 8101 and a communication interface 8102. In actual application, the terminal device 8100 may further include at least one memory 8103 and a bus 8104. The processor 8101, the communication interface 8102, and the memory 8103 are connected through the bus 8104.

The processor 8101 is a module for performing an arithmetic operation and/or a logic operation, and may be one or a combination of processing modules such as a central processing unit (CPU), a graphics processing unit (GPU), a microprocessor unit (MPU), an application-specific integrated circuit (ASIC), a field programmable gate array (FPGA), a complex programmable logic device (CPLD), a coprocessor (assisting the central processing unit in corresponding processing and application), and a microcontroller unit (MCU).

The communication interface 8102 may be configured to provide information input or output for the at least one processor; and/or the communication interface 8102 may be configured to receive data transmitted from an external environment and/or transmit data to an external environment. The communication interface 8102 may be an interface of a wired link, including an Ethernet cable or the like; or may be an interface of a wireless link (Wi-Fi, Bluetooth, universal wireless transmission, an on-board short-range communication technology, or another short-range wireless communication technology). In this application, the communication interface may serve as a network interface.

The memory 8103 is configured to provide storage space, and the storage space may store data such as an operating system and a computer program. The memory 8103 may be one or a combination of a random access memory (RAM), a read-only memory (ROM), an erasable programmable read-only memory (EPROM), a compact disc read-only memory (CD-ROM), and the like.

The at least one processor 8101 in the terminal device 8100 is configured to invoke the computer program stored in the at least one memory 8103, to perform the foregoing information processing method, for example, the information processing method shown in FIG. 4.

In addition, the disclosure provides a storage medium. The storage medium may store a computer program for the foregoing information processing method, and the computer program includes program instructions. When one or more processors load and execute the program instructions, the descriptions of the information processing method can be implemented. Details are not described again. Beneficial effects of the same method are not described herein again either. It can be understood that the program instructions may be deployed for execution on one computer device or a plurality of computer devices capable of communicating with each other.

The computer-readable storage medium may include a ROM, a RAM, a solid-state drive (SSD), an optical disc, or the like.

The disclosure further provides a computer program product or a computer program. The computer program product or the computer program includes computer instructions, and the computer instructions are stored in a computer-readable storage medium. A processor of a computer device reads the computer instructions from the computer-readable storage medium, and the processor executes the computer instructions, so that the computer device performs the method provided.

The disclosure further provides another computer program product. The computer program product includes a computer program or computer instructions, and the operations of the information processing method provided are implemented when the computer program or the computer instructions are executed by a processor.

What is disclosed above is merely exemplary embodiments, and certainly is not intended to limit the scope of the claims of this application. Therefore, equivalent variations made in accordance with the claims of this application shall fall within the scope of this application.

What is claimed is:

1. An information processing method, applied to an information processing system, wherein the information processing system comprises a terminal device, an information management device, a plurality of communication service systems, and a gateway device connected to the information management device and to each of the plurality of communication service systems, each of the plurality of communication service systems corresponding to a respective communication service network, the information processing method comprising:

detecting, by the gateway device, a network connection status of the terminal device through each of the plurality of communication service systems;

receiving, by the gateway device, detection response information from the terminal device through a target communication service network of the plurality of communication service networks; and determining, by the gateway device, target routing information that indicates that the gateway device and the terminal device are connected through the target communication service network.

2. The information processing method according to claim 1, wherein detecting the network connection comprises:

transmitting detection signaling for the detecting the terminal device to each of the plurality of communication service systems, for each of the plurality of communication service networks, when the terminal device is not connected to the communication service network, the communication service system corresponding to the communication service network discards the detection signaling, and when the terminal device accesses the communication service network, the communication service system corresponding to the communication service network transmits the detection signaling to the terminal device; and wherein the detection response information is generated by the terminal device based on the detection signaling.

3. The information processing method according to claim 2, wherein the plurality of communication service networks correspond to different service provider objects, and determining the target routing information comprises:

obtaining a first protocol address of a target communication service system that corresponds to the target communication service network;

obtaining a second protocol address of the terminal device, the second protocol address being assigned to the terminal device by a service provider object to which the target communication service network belongs; and generating the target routing information based on the first protocol address and the second protocol address, wherein the first protocol address is a next hop in the target routing information, and the second protocol address is a destination address in the target routing information.

4. The information processing method according to claim 1, further comprising:

receiving downlink data from the information management device; and based on the downlink data being data to be transmitted to the terminal device, transmitting the downlink data to the terminal device based on a data transmission path indicated by the target routing information.

5. The information processing method according to claim 1, further comprising:

based on the target routing information being different from initial routing information stored on the gateway device, changing the initial routing information recorded to the target routing information, wherein the initial routing information indicates that the gateway device and the terminal device are connected through an initial communication service network, and wherein the initial communication service network is a communication service network to which the terminal device is connected prior to switching to the target communication service network.

6. The information processing method according to claim 1, wherein the information processing system further comprises a network management device that is connected to the gateway device, and wherein the method further comprises:

determining that the terminal device is in an abnormal state; and reporting the abnormal state of the terminal device to the network management device.

7. The information processing method according to claim 6, wherein determining that the terminal device is in the abnormal state comprises:

determining that no detection response information has been received from the terminal device through the plurality of communication service networks within a preset time period.

8. The information processing method according to claim 6, wherein determining that the terminal device is in the abnormal state comprises:

determining that no detection response information has been received from the terminal device through the plurality of communication service networks within a preset number of detection attempts.

9. The information processing method according to claim 6, further comprising:

based on determining that the terminal device is in the abnormal state, deleting the target routing information.

10. The information processing method according to claim 1, wherein the network connection status of the terminal device is detected periodically, a frequency of the detection being determined based on the network connection status.

11. A gateway device configured to operate in an information processing system, wherein the information processing system further comprises a terminal device, an information management device, a plurality of communication service systems, each of the plurality of communication service systems corresponding to a respective communication service network, wherein the gateway device is connected to the information management device and to each of the plurality of communication service systems, the gateway device comprising:

at least one memory configured to store computer program code; and at least one processor configured to operate as instructed by the computer program code, the computer program code comprising:

detecting code configured to cause the at least one processor to detect a network connection status of the terminal device through each of the plurality of communication service systems;

receiving code configured to cause the at least one processor to receive detection response information from the terminal device through a target communication service network of the plurality of communication service networks; and determining code configured to cause the at least one processor to determine target routing information that indicates that the gateway device and the terminal device are connected through the target communication service network.

12. The gateway device according to claim 11, wherein detecting the network connection comprises:

transmitting detection signaling for the detecting the terminal device to each of the plurality of communication service systems, for each of the plurality of communication service networks, when the terminal device is not connected to the communication service network, the communication service system corresponding to the communication service network discards the detection signaling, and when the terminal device accesses the communication service network, the communication service system corresponding to the communication service network transmits the detection signaling to the terminal device; and wherein the detection response information is generated by the terminal device based on the detection signaling.

13. The gateway device according to claim 12, wherein the plurality of communication service networks correspond to different service provider objects, and determining the target routing information comprises:

obtaining a first protocol address of a target communication service system that corresponds to the target communication service network;

obtaining a second protocol address of the terminal device, the second protocol address being assigned to the terminal device by a service provider object to which the target communication service network belongs; and generating the target routing information based on the first protocol address and the second protocol address, wherein the first protocol address is a next hop in the target routing information, and the second protocol address is a destination address in the target routing information.

14. The gateway device according to claim 11, wherein the receiving code is further configured to cause the at least one processor to:

receive downlink data from the information management device; and wherein the program code further comprises transmitting code configured to cause the at least one processor to transmit, based on the downlink data being data to be transmitted to the terminal device, the downlink data to the terminal device based on a data transmission path indicated by the target routing information.

15. The gateway device according to claim 11, wherein the determining code is further configured to cause the at least one processor to:

based on the target routing information being different from initial routing information stored on the gateway device, change the initial routing information recorded to the target routing information, wherein the initial routing information indicates that the gateway device and the terminal device are connected through an initial communication service network, and wherein the initial communication service network is a communication service network to which the terminal device is connected prior to switching to the target communication service network.

16. The gateway device according to claim 11, wherein the detecting code is further configured to cause the at least one processor to:

determine that the terminal device is in an abnormal state; and report the abnormal state of the terminal device to a network management device.

17. The gateway device according to claim 16, wherein determining that the terminal device is in the abnormal state comprises:

determining that no detection response information has been received from the terminal device through the plurality of communication service networks within a preset number of detection attempts.

18. The gateway device according to claim 16, wherein the program code further comprises:

deleting code configured to cause the at least one processor to delete the target routing information based on determining that the terminal device is in the abnormal state.

19. The gateway device according to claim 11, wherein the detection code is further configured to cause the at least one processor to detect the network connection status of the terminal device periodically, wherein a frequency of the detection is determined based on the network connection status.

20. A non-transitory computer-readable medium containing program code applied to a gateway device configured to operate in an information processing system, wherein the information processing system further comprises a terminal device, an information management device, a plurality of communication service systems, each of the plurality of communication service systems corresponding to a respective communication service network, wherein the gateway device is connected to the information management device and to each of the plurality of communication service systems, wherein the program is configured to cause the gateway device to:

detect a network connection status of the terminal device through each of the plurality of communication service systems;

receive detection response information from the terminal device through a target communication service network of the plurality of communication service networks; and determine target routing information that indicates that the gateway device and the terminal device are connected through the target communication service network.

\* \* \* \* \*